Sept. 5, 1967 M. L. CONRAD 3,339,769
TRACTOR LOADER
Filed Sept. 17, 1965 3 Sheets-Sheet 1

INVENTOR
MARCUS L. CONRAD
BY
ATTORNEYS

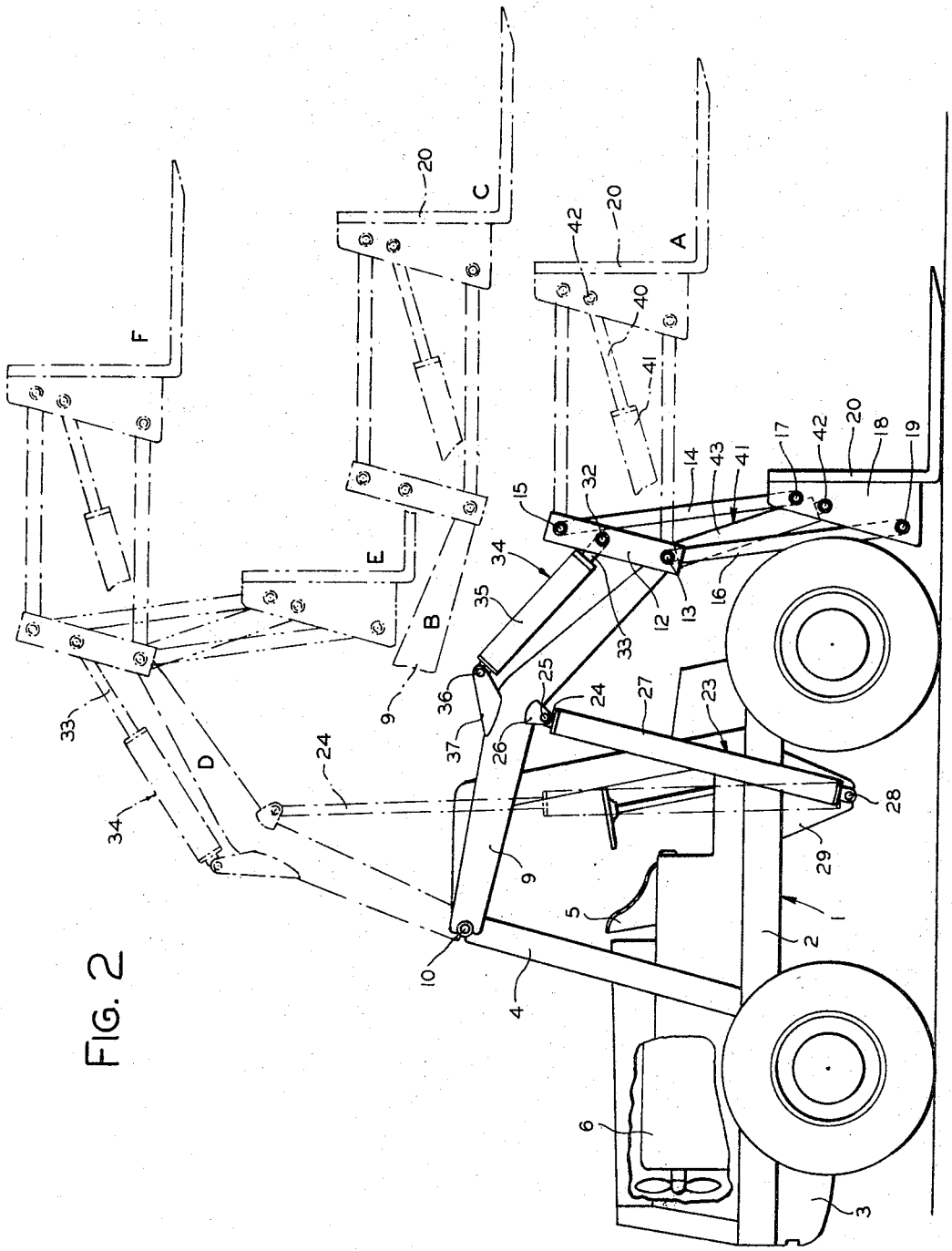

Sept. 5, 1967                    M. L. CONRAD                    3,339,769
                                 TRACTOR LOADER
Filed Sept. 17, 1965                                          3 Sheets-Sheet 3

INVENTOR
MARCUS L. CONRAD
BY
ATTORNEYS

United States Patent Office 3,339,769
Patented Sept. 5, 1967

3,339,769
TRACTOR LOADER
Marcus L. Conrad, Stevensville, Mich., assignor to Clark Equipment Company, a corporation of Michigan
Filed Sept. 17, 1965, Ser. No. 488,211
4 Claims. (Cl. 214—770)

This invention relates to tractor loaders for use in handling logs, lumber and other material in loading and unloading operations.

Loaders of the general type referred to are known and rather extensively used. In many of the known loaders a single section boom is provided which lacks sufficient effective length or reach for high stacking or piling of lumber or logs and for loading and unloading the off or far side of a freight car or truck. Also, in some of the known loaders, there is risk of tipping of the tractor or vehicle, when transporting a load and in making a high lift for stacking or piling. Further, certain of the known loaders do not provide means whereby the load carrying member may be adjusted to compensate for an incline or slant of an uneven surface upon which the tractor may be supported during the loading or unloading operation.

My invention is directed to an unloader which avoids the above-noted objections to the mentioned known loaders. To that end, I provide a two section boom capable of exceptionally high lift and reach. The forward section of the boom may be used for low lift operations and for transporting the load, being then disposed adjacent the ground or supporting surface and in proximity to the front of the tractor so as to minimize any tendency to tipping. The rearward or main section of the boom is pivotally mounted on the tractor adjacent the rear thereof. During high lift operation, the forward section of the boom may be retained in its rearward retracted position until the main section has been raised to proper extent and then projected forwardly for placing the load upon the stack or pile being formed, thereby minimizing any tipping tendency during high lift operations. I also provide means whereby the load carrying member may be tilted sidewise to compensate for unevenness or inclination of the ground or surface upon which the tractor is positioned so as to guard against possible slippage of the load. Further objects and advantages of my invention will appear from the detail description.

In the drawings:

FIGURE 2 is a side view, partly broken away, of the tractor loader of FIGURE 1, showing in full lines the parts in the positions which they occupy when the load carrying member is in its position of FIGURE 1 and, in broken lines, the parts in the positions which they may assume in various stacking or loading operations;

Figure 1:
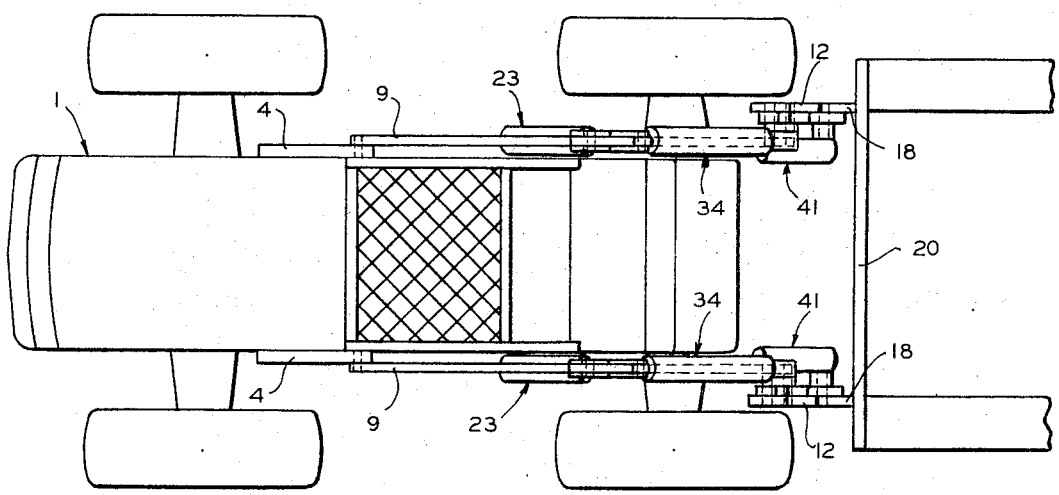
FIGURE 1 is a plan view of a tractor loader embodying my invention with the load carrying member in a lowered retracted position.
Figure 3:
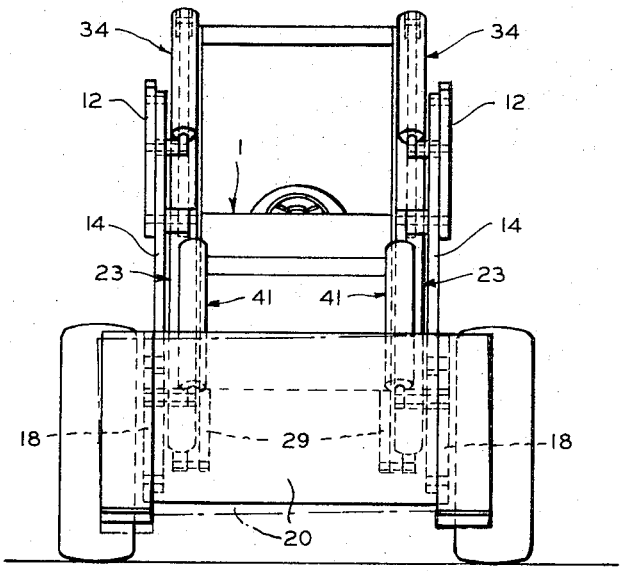
Figure 4:
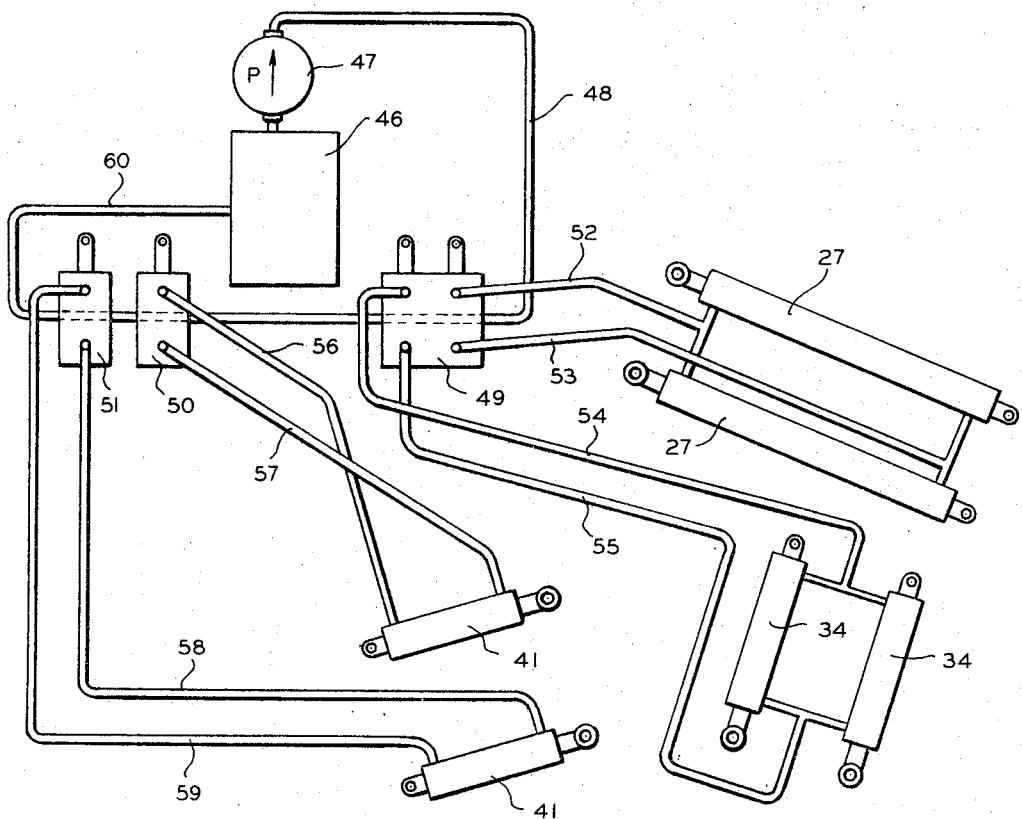

FIGURE 3 is a front view of the tractor loader of FIGURE 1, with the load carrying member raised a short distance and projected forwardly, the load carrying member being shown in full lines in the substantially horizontal position which it occupies when the tractor loader is resting upon a level surface and, in broken lines, in the transversely inclined position to which it may be moved to compensate for an inclined surface upon which the tractor loader may be resting; and FIGURE 4 is a schematic view of the hydraulic operating system for the boom structure.

I have shown the loader of my invention as including, by way of example, a wheel mounted tractor 1 having a main frame 2 to the rear of which is secured a counterweight 3. Two uprights or posts 4 are fixed at their lower ends to the frame 2 at opposite sides thereof and extend upward and forward at a slight inclination above the operator's seat 5 in rear of which is disposed a suitable power plant 6. The tractor 1 is of conventional type and need not be described in further detail, it being understood that any suitable tractor or vehicle may be used as desired or as circumstances may require.

Angular side beams 9 are pivoted at their rearward ends at 10 on the upper ends of the posts or supports 4 and are connected at their forward portions by cross braces 11, shown more clearly in FIGURE 1. The beams 9, connected by the cross braces 11, constitute a main boom movable about the common axis of the pivots 10. A link member 12 is pivoted at its lower end, at 13, on the forward end of each beam 9, the pivots 13 being coaxial, as will be understood. An upper link 14 is pivoted at its rearward end, at 15, to the upper end of each of the links 12. A lower link 16 is pivoted at its rearward end, at 13, to the beam 9 and the lower end of link 12. The forward end of link 14 is pivoted, at 17, to a bracket plate 18 a short distance from the upper end thereof and the forward end of link 16 is pivoted at 19, at its forward end, to bracket plate 18 a short distance from the lower end thereof. The bracket plate 18 is fixed to a load carrying member 20 of suitable type, shown as a conventional lift fork. The link members 12, 14, 16 and 18 together constitute a parallelogram or pantograph structure, it being understood that there are two such pantograph structures, one at each side of the forward end of the boom and that the corresponding pivots thereof are coaxial.

A hydraulic motor or jack 23 of conventional type extends between each of the beams 9 and the main frame 2 of the tractor with the upper end of its piston rod 24 pivoted at 25 to a bracket 26 extending downwardly from beam 9 and with the lower end of its cylinder 27 pivoted, at 28, to a bracket 29 secured to and extending downwardly from the corresponding side of frame 2. As will be understood, when the piston rods 29 of the jack 23 are fully retracted the main boom comprising the beams 9 is in its lowered position shown in FIGURE 2. When the main boom is in its fully lowered position the pantograph structures are collapsed with the fork 20 in its lowermost position and the links 14 and 16 of each of the pantograph structures extending downwardly in spaced parallel relation from the link 12.

The link 12 of each of the pantograph structures is pivoted intermediate its ends at 32 to the forward end of piston rod 33 of a hydraulic jack 34, the cylinder 35 of which is pivoted, at its rearward end, at 36, to a bracket 37 fixed to beam 9 and extending upwardly and forwardly therefrom. With the parts in the position shown in full lines in FIGURE 2, the piston rod 33 of the hydraulic jack 34 is in its fully retracted position as shown.

The piston rod 40 of a hydraulic jack 41 is pivotally connected, at 42, to bracket plate 18 a short distance below the forward pivot of link 41. The rearward end of cylinder 43 of hydraulic jack 41 is pivotally connected at 13 to the lower end of link 12. As will be understood, each of the pantograph structures is provided with a hydraulic jack 41 extending diagonally thereof between the lower end of link 12 and the upper portion of bracket plate 18, such jacks being effective for extending and collapsing the pantograph structures to desired extent.

In low lift operations, the fork 20, adjusted to proper height by means of the jacks 41, is inserted beneath the load. The loaded fork is then raised, by means of the jacks 41, to position A, or to an intermediate position, overlying the stack or pile to be formed, upon which the load is deposited. It will be noted that in such operation the pantograph structures are extended effective for moving the fork a material distance forwardly of its full line position shown in FIGURE 2. During such low lift operation, the main boom comprising the beams 9 remains in its fully lowered position and the pantograph structures become, in effect, a supplementary forward boom section for effecting low lift operation.

In performing higher lift operations, the main boom is raised by means of the jacks 23 until the beams 9 thereof are disposed approximately at position B indicated in broken lines in FIGURE 2, with the pantograph structures in collapsed condition so as to reduce the leverage effect of the load and thereby reduce tendency to tipping of the vehicle or tractor. After the beams reach position B, they are locked in such position by the jacks 23 and the pantograph structures are then extended by the jacks 41 thereby projecting forks 20 to position C for placing the load upon the pile or stack being formed. It will be seen that in low lift operation the fork may be positioned a substantial distance forwardly of the vehicle, giving desired reach, and in the intermediate lift operation the fork may be advanced an appreciable distance further than in the low lift operation. During the low lift and the intermediate lift operations the pistons 33 of the jacks 34 remain, as a general rule, in fully retracted position though they may be projected to some extent, if desired, for tilting the fork 20 downwardly and forwardly to desired extent.

In extremely high lift operations, the piston rods of the jacks 27 are projected to a maximum extent effective for raising the beams 9 to their topmost position D shown in FIGURE 2. During such operation, the pantograph structures remain in collapsed condition so that the fork 20 depends from the forward ends of beams 9, in the position E indicated in broken lines, and the load does not exert a leverage effect tending to cause objectionable tilting of the tractor. During raising of the beams 9 to their position D the piston rods 33 of the jacks 34 are extended so as to tilt the links 12 of the pantograph structures forwardly effective for maintaining the fork 20 in a substantially level horizontal position transversely. After the beams 9 reach their position B, with the piston rods 33 of jacks 34 extended, the pantograph structures are extended by projecting the piston rods 40 of the jacks 41, thus moving the loaded fork 20 upwardly and forwardly to its broken line position F indicated in FIGURE 2. The loaded fork is thus raised a further distance and is also projected forwardly the full length of the pantograph structures, thus providing extra high lift and reach.

Referring to FIGURE 3, the fork 20 is shown in full lines in its transversely horizontal raised position A indicated in FIGURE 2. It is also indicated, in broken lines, as tilted slightly transversely toward the left. That is accomplished by projecting the piston rod 40 of the righthand pantograph structure to a somewhat greater extent than the piston rod 40 of the jack of the lefthand pantograph structure, thereby imparting a slight twist to the latter structure sufficient to compensate for a slant to the right of an inclined surface upon which the tractor may be resting. In similar manner, if the tractor is resting upon a surface which slants to the left, the fork may be tilted toward the right by projecting the piston rod 40 of the jack 41 of the lefthand pantograph structure to a greater extent than that of the righthand pantograph structure. As will be understood from what has been said, the jacks 41 of the pantograph structures may be selectively operated for tilting the fork 20 transversely, as and for the purpose above stated, or they may be operated simultaneously and to the same extent for raising and lowering fork 20 and projecting it forwardly in the manner previously explained. Further, the boom structure of my invention may be used for either loading operations or unloading and stacking operations, as will be understood.

Referring to FIGURE 4, a pressure fluid supply reservoir or tank 46 is suitably mounted on the tractor 1. Pressure fluid is delivered under appropriate pressure from the tank 46 by a pump 47 to a pressure line or conduit 48 for supplying fluid under pressure to valve assemblies 49, 50 and 51. The valve assembly 49 is of conventional type and includes two spool valve members controlling flow of pressure fluid to and from the ends of jacks 27 through flexible conduits 52 and 53 connected thereto, the flow of the pressure fluid being controlled by one of the spool valve members which is also effective for cutting off the flow of fluid and locking the jacks in adjustment, as is well known. In like manner, the other spool member of the valve assembly 49 is effective for controlling flow of pressure fluid to the ends of the jacks 34, through flexible conduits 54 and 55 and for interrupting such flow of pressure fluid and locking the jacks 34 in adjustment. As will be understood from what has been said, the jacks 27 are operated simultaneously and the piston rods 24 thereof are moved in the same direction and to the same extent in the raising and lowering of the side beams 9 of the main boom. Likewise, the jacks 34 are operated simultaneously and the piston rods 33 thereof are moved in the same direction and to the same extent for tilting the pantograph structures about the common axis of the pivots 13, as and for the reasons above stated. The valve assembly 50 comprises a spool valve member which controls flow of pressure fluid to and from the ends of one of the jacks 41, through flexible conduits 56 and 57 while also being effective for locking the piston rod of jack 41 in adjustment. The valve assembly 51, also of conventional type, includes a spool valve member which controls flow of pressure fluid to and from the ends of the other jack 41 through flexible conduits 58 and 59, while also being effective for locking the piston rod of such jack 41 in desired adjustment. Pressure fluid discharged from the jacks is returned to the reservoir or tank 46 through a return line or conduit 60. The jacks and the control valves therefor are of conventional type and operate in a known manner and need not be described in further detail. It is to be noted, however, that the jacks 41 are independently operated when desired for adjusting the fork 20 transversely to compensate for an inclined surface upon which the tractor may be resting, as above described. Also, any suitable means may be provided for optionally operating both of the valve assemblies 50 and 51 simultaneously effective for operating both of the jacks 41 simultaneously and to the same extent, when the tractor rests upon a level surface and tilting of the fork 20 transversely is neither necessary nor desired.

As will be understood, changes and detail may be resorted to without departing from the field and scope of my invention, and I intend to include all such variations, as fall within the scope of the appended claims, in this application in which the preferred form only of my invention has been disclosed.

I claim:

1. In a tractor loader, a mobile vehicle, pantograph structures at opposite sides of said vehicle pivotally mounted thereon and extending forwardly thereof, a load carrying member mounted on said structures at the forward ends thereof, and means for selectively extending and collapsing said structures to the same extent and to different extent effective for moving said member upwardly and forwardly away from said vehicle and downwardly and rearwardly toward said vehicle, extending and collapsing of said pantograph structures to different extent being effective for imparting twist to said structures and thereby lowering one side of said member relative to the other side thereof.

2. In a tractor loader, a mobile vehicle, pantograph structures at opposite sides of said vehicle respectively comprising upwardly extending rearward and forward link members and upper and lower link members pivoted to the upper and lower ends of said rearward and forward members, said rearward members being pivotally mounted at their lower ends on said vehicle for movement about a common transverse axis and said structure projecting forwardly of said vehicle, a load carrying member carried by said forward link members of said structures, means for optionally raising and lowering said pantograph structures about said pivot axis of said rearward link members and for restraining said structures against such movements, and means individual to said pantograph structures connecting said rearward and forward link members thereof and effective for optional and selectively extending and collapsing said structures and locking them in adjustment.

3. In a tractor loader, a mobile vehicle, fixed supports extending upwardly from said vehicle at the sides and adjacent the rear thereof, a boom comprising side beams pivoted on said supports for movement about a common transverse axis and extending forwardly therefrom, means for raising and lowering said boom, pantograph structures at opposite sides of said vehicle respectively pivoted on said beams on a common transverse axis and extending therefrom forwardly of said vehicle, a load carrying member mounted on said structures at the forward ends thereof, means connecting said beams and structures effective for optionally raising and lowering the latter about sad pivotal mounting thereof and for restraining them against such movements, and means individual to said pantograph structures effective for optionally and selectively extending and collapsing them.

4. In a tractor loader, a mobile vehicle, fixed supports extending upwardly from said vehicle at the sides and adjacent the rear thereof, a boom comprising side beams pivoted on said supports for movement about a common transverse axis and extending forwardly therefrom, means for raising and lowering said boom, pantograph structures at opposite sides of said vehicle respectively comprising upwardly extending rearward and forward link members and upper and lower link members pivoted to the upper and the lower ends of said rearward and forward members, said rearward members being respectively pivoted at their lower ends on said side beams for movement about a common transverse axis, a load carrying member carried by said forward link members of said structures, means connecting said beams and said rearward link members effective for optionally raising and lowering said pantograph structures about said pivot axis of said rearward link members and for restraining said structures against such movements, and means individual to said pantograph structures connecting said rearward and forward link members thereof and effective for optionally and selectively extending and collapsing said structures and locking them in adjustment.

References Cited
UNITED STATES PATENTS

| | | | |
|---|---|---|---|
| 2,415,515 | 2/1947 | McOscar | 214—131 |
| 2,449,212 | 9/1948 | Fraga | 214—140 |
| 2,712,389 | 7/1955 | Sewell et al. | 214—140 |
| 2,753,060 | 7/1956 | Lull | 214—140 |
| 2,789,712 | 4/1957 | Christensen | 214—140 |
| 3,018,011 | 1/1962 | Ackermann | 214—140 |
| 3,127,999 | 4/1964 | Gostomski | 214—140 |
| 3,187,911 | 6/1965 | Christenson | 214—762 |

HUGO O. SCHULZ, *Primary Examiner.*